United States Patent [19]
Cherwink, deceased

[11] 3,727,086
[45] Apr. 10, 1973

[54] MOTOR WITH RELATIVELY ROTATABLE STATOR AND ROTOR

[76] Inventor: Homer E. Cherwink, deceased, late of 1515 Fowler Cr. Road, Sonoma, Calif. 95476 Hazel O. Cherwink, administratrix

[22] Filed: June 1, 1971

[21] Appl. No.: 148,576

[52] U.S. Cl. ................................................ 310/119
[51] Int. Cl. ............................................... H02k 23/60
[58] Field of Search .................... 310/115, 118, 119; 318/205

[56] References Cited
UNITED STATES PATENTS
2,881,338  4/1959  Banning ........................... 310/119
2,249,671  7/1941  Skowron ........................... 310/119

Primary Examiner—D. F. Duggan
Attorney—Julian Caplan and Gregg, Hendricson & Caplan

[57] ABSTRACT

The "stator" of a polyphase a.c. motor is rotatably mounted in a base and arranged to drive a first pump and the rotor to drive both the load of the motor and a second pump. By valve arrangements, the pump outputs create varying back-pressures which control the relative speeds of rotation of the rotor and stator, and thus the speed of rotation of the shaft driving the load is varied.

2 Claims, 1 Drawing Figure

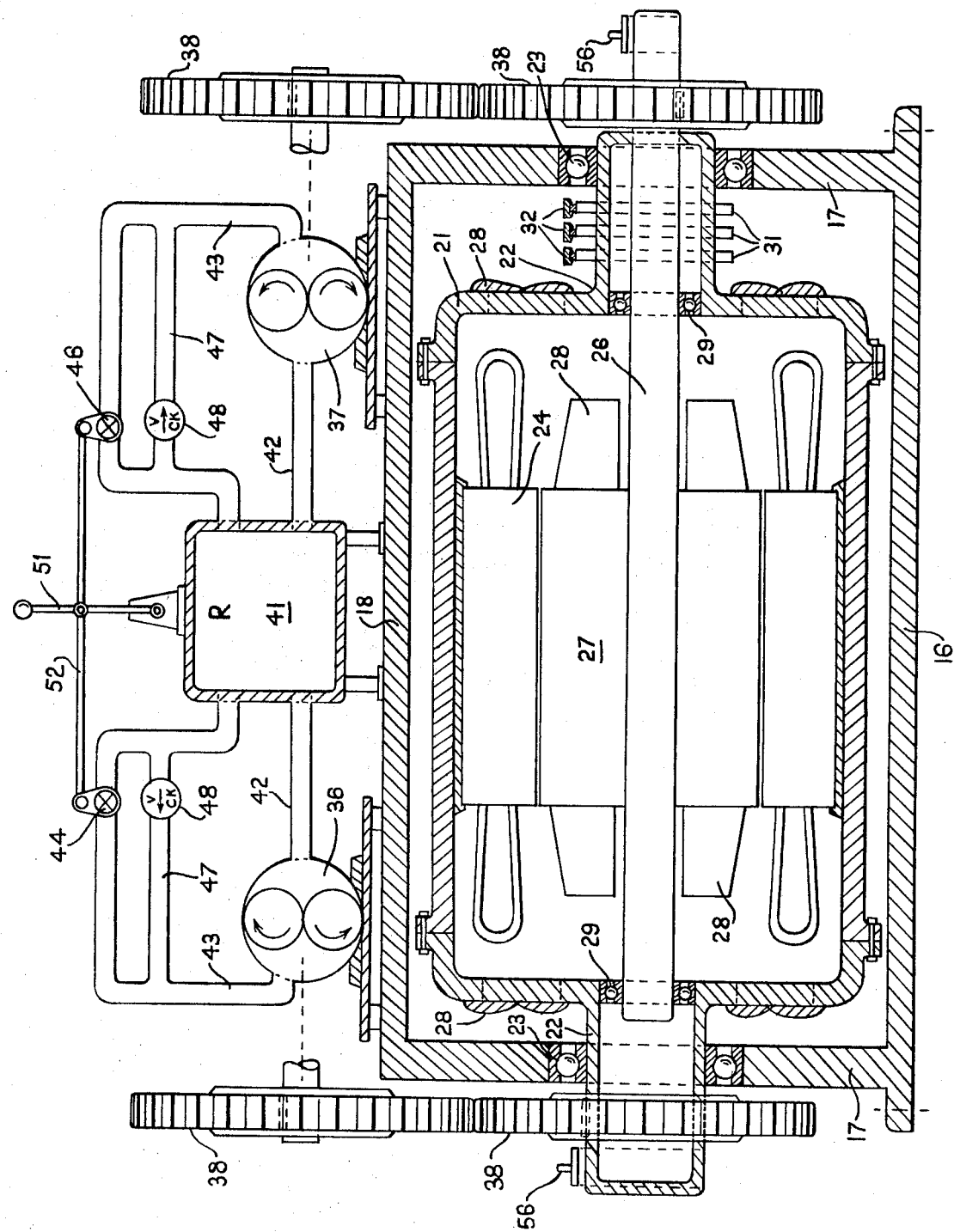

MOTOR WITH RELATIVELY ROTATABLE STATOR AND ROTOR

This invention relates to a new and improved motor with relatively rotatable stator and rotor. More particularly, the invention relates to a polyphase a.c. motor of a synchronous type wherein the motor casing and its associated stator windings are rotatably mounted relative to a stationary base and the rotor is rotatable both relative to the base and to the casing and stator. The casing and rotor are drivingly connected to a pair of positive displacement pumps and the outlet of each pump is valve controlled so that the back pressure of each pump may be adjusted in an inversely proportional relationship. Thus, the speed of rotation of the drive shaft is varied by adjustment of the valves in the outputs of the two pumps.

A principal feature of the present invention is the fact that the speed of rotation of the load may be varied from zero to a maximum at the control of the operator by mechanical means. It is a further feature of the invention that full torque is delivered at all such speeds. It will be understood that the valve settings may be remotely controlled, or automatically controlled, as desired. Hence, a particular feature and advantage of the invention is the simplicity by which the speed variations are controlled.

Another feature of the invention is the fact that the graduations of speeds are continuous rather than in stages as is true in certain other types of speed controls for motors.

Another feature of the invention is the fact that the number of parts which are subject to maintenance and wear is reduced to a minimum.

A still further feature of the invention is the economy and efficiency of the device in that no power is diverted, as is the case in other types of speed controls. In many other speed controls power is dissipated in heat by use of resistance elements.

A still further feature of the invention is the fact that the overall weight of the controls for the motor is reduced. A common type of speed control, which the present invention is intended to replace, is the motor generator set commonly used in driving elevators, winches, etc., thereby eliminating the necessity of converting to D. C. power to accomplish variable speed controls. The present invention has considerably lesser size and weight as contrasted with such equipment.

Another feature of the invention is the provision of automatic overload protection which consists of a by-pass around the pump valves, a feature which is particularly useful when there is an extreme speed reduction or overload which otherwise might damage the motor.

Other objects of the present invention will become apparent upon reading the following specification and referring to the accompanying drawings in which similar characters of reference represent corresponding parts in each of the several views.

In the drawings:

The single FIGURE is a schematic, vertical, sectional view through the motor and its associated mechanism with parts broken away to reveal internal construction.

Base 16 is provided with upstanding ends 17 and a top 18. A motor casing 21 is rotatably mounted above base 16 and under top 18. For such purpose, there are annular end protrusions 22 at either end of the casing which are rotatably mounted in bearings 23 in ends 17. The interior of casing 21 is provided with windings for stator 24 which rotate therewith.

Motor shaft 26 is rotatable within casing 21 and provided with a rotor 27 which cooperates with the stator 24 to drive shaft 26 as is well understood in the polyphase a.c. motor art. To assist in cooling the windings of the stator, fan blades 28 may be provided at the ends of the rotor in a manner well understood in this art. The shaft 26 is supported by bearings 29 within the casing 21. Slip rings 31 are provided externally of casing 21 and are contacted by brushes 32. The number of slip rings depends upon the winding of the motor. In this respect, the motor is conventional. Thus a three-phase motor is illustrated, such a motor tending to be synchronous when mounted in conventional manner but here being adjustable in speed of rotation of shaft 26 as hereinafter appears.

Mounted to be driven by the rotation of casing 21 is a first positive displacement pump 36. In the accompanying drawings, said pump 36 is shown located on top 18 but it will be understood that the pump could be directly connected to one of the end protrusions 22 or be otherwise driven by rotation of the casing 21. Similarly, a second pump 37, similar to pump 36, is mounted on top 18. The pumps 36, 37 are preferably gear type pumps and are also preferably reversible, a type commercially available. In the drive shown in the accompanying drawing, separate gear trains 38 are used to drive the shafts of pump 36 from one end protrusion 22, of casing 21 and of pump 37 from shaft 26. As has been stated, other drive means may be employed, such as direct connection. It will further be understood, that the shaft 26 is attached to the load of the motor and the speed of rotation of the load is variable.

A hydraulic fluid reservoir 41 is provided and is connected by conduits 42 to the intake of pumps 36, 37. The outlets of said pumps are connected by separate conduits 43 back to the reservoir 41. A valve 44 positioned in the conduit of the first pump 36 is provided as is a valve 46 in the conduit 43 of the second pump 37. The valves 44, 46 are by-passed by conduits 47 in which are located by-pass valves 48 which open when the pressure in conduits 43 exceeds a predetermined maximum which prevents overload of the motor.

A control 51 is provided and connected by valve gear 52 to the valves 44, 46. It will be understood that remote control, or automatic control, can be substituted.

To commence operation of the motor, the lever 51 is positioned in stop position with valve 46 closed so as to restrain rotation of pump 37. Hence, rotor 27 does not turn. In this position of the valve control 51, valve 44 is full open, thus allowing pump 36 to turn freely. In this positioning of lever 51, stator 24 revolves at the maximum rate of speed for which the motor is wound. After the motor has started, lever 51 is adjusted so that valve 46 is partially opened and valve 44 is closed in a proportionate amount. As valve 46 opens a small amount, the pump 36 is partially restricted and the turning of the stator 24 is likewise partially restricted. The stator 24 continues to be increasingly restricted while the rotor 27 increases in its speed as valve 46 is opened wider. At full speed position of lever 51, the stator valve 44 is completely closed, thereby stopping the rotation of pump 36 and of the casing 21 and stator 24. At this position, valve 46 is full-open, allowing free flow of fluid from pump 37. The rotor 27 is then turning at the maximum design speed of the operation of the motor.

At the load capacity of the motor, when the pressure in one of the lines 43 exceeds a predetermined amount, by-pass valves 48 open. This prevents overloading of the motor because of an improperly fast movement of lever 51. Also, the valves 48 open under extreme retardation and overload.

It is possible to reverse the motor electrically by motor switching means well understood in the A.C. motor art provided the pumps 36, 37 are reversible so as not to affect the flow of fluid.

Brakes 56 may be used at full speed to lock the stator. At positive stop the brakes compensate for internal leakage of the pumps.

What is claimed is:

1. A variable speed synchronous motor control comprising a base, a stator, mounting means for said stator rotatably mounted in said base, a rotor, a shaft for said rotor rotatably mounted in said mounting means, said stator and rotor when electrically energized turning said shaft relative to said stator, a first positive displacement pump drivingly connected for rotation with said mounting means, a second positive displacement pump drivingly connected for rotation with said shaft, a reservoir for said pumps, a first valve and a second valve regulating volume of discharge from said first and second pumps respectively, a valve gear connected to said valves whereby when one said valve is opened the other said valve is closed a proportional amount, by-pass conduits around each said valve and a pressure relief valve in each said conduit.

2. A motor control according to claim 1 which further comprises a first gear train between said mounting means and said first pump and a second gear train between said shaft and said second pump.

* * * * *